US009188050B2

(12) United States Patent
Naito et al.

(10) Patent No.: US 9,188,050 B2
(45) Date of Patent: Nov. 17, 2015

(54) ENGINE COOLING SYSTEM

(71) Applicant: MAZDA MOTOR CORPORATION, Hiroshima (JP)

(72) Inventors: Masahiro Naito, Hiroshima (JP); Daisuke Tabata, Hiroshima (JP); Daisuke Matsumoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/191,259

(22) Filed: Feb. 26, 2014

(65) Prior Publication Data
US 2014/0283765 A1   Sep. 25, 2014

(30) Foreign Application Priority Data

Mar. 21, 2013   (JP) .................. 2013-057813

(51) Int. Cl.
| | |
|---|---|
| *F01P 7/14* | (2006.01) |
| *F01P 3/12* | (2006.01) |
| *F02M 25/07* | (2006.01) |
| *F01P 7/16* | (2006.01) |
| *F01P 3/20* | (2006.01) |
| *F02B 29/04* | (2006.01) |

(52) U.S. Cl.
CPC .............. *F01P 3/12* (2013.01); *F02M 25/0707* (2013.01); *F02M 25/0709* (2013.01); *F02M 25/0728* (2013.01); *F02M 25/0731* (2013.01); *F02M 25/0732* (2013.01); *F02M 25/0738* (2013.01); *F01P 3/207* (2013.01); *F01P 7/16* (2013.01); *F01P 7/165* (2013.01); *F01P 2007/146* (2013.01); *F01P 2025/30* (2013.01); *F01P 2050/04* (2013.01); *F01P 2060/08* (2013.01); *F01P 2060/16* (2013.01); *F02B 29/0406* (2013.01); *F02M 25/0713* (2013.01); *F02M 25/0718* (2013.01); *Y02T 10/121* (2013.01)

(58) Field of Classification Search
CPC ......... F01P 7/16; F01P 2050/04; F01P 3/207; F01P 7/165; F01P 2007/146
USPC ........................................................ 123/41.09
See application file for complete search history.

(56) References Cited

U.S. PATENT DOCUMENTS 7,370,612 B2 *   5/2008   Hanai .................... 123/41.14

FOREIGN PATENT DOCUMENTS

| JP | 2010-163920 A | 7/2010 | |
|---|---|---|---|
| WO | WO 2007058225 A1 * | 5/2007 | ................ F01P 3/02 |

* cited by examiner

*Primary Examiner* — Lindsay Low
*Assistant Examiner* — Charles Brauch
(74) *Attorney, Agent, or Firm* — Studebaker & Brackett PC

(57) ABSTRACT

Disclosed is an engine cooling system which comprises: a head-side circulation pathway through which coolant from a water pump is circulated via a water jacket of a cylinder head and an EGR cooler; a block-side circulation pathway through which the coolant from the water pump is circulated via a water jacket of a cylinder block; and a switching valve unit operable, during cold operation of the engine, to pass the coolant from the water pump, along the head-side circulation pathway, and, when a temperature of the engine is raised up to a predetermined value, to pass the coolant from the water pump, along not only the head-side circulation pathway but also the block-side circulation pathway.

5 Claims, 8 Drawing Sheets

ENGINE COOLING SYSTEM

TECHNICAL FIELD

The present invention relates to an engine cooling system for an automotive vehicle or the like, and particularly belongs to the technical field of an engine configured to be cooled by coolant being circulated.

BACKGROUND ART

Heretofore, in automotive vehicles and the like, with a view to improving fuel economy performance and/or exhaust gas purification performance, a technique of early warming up an engine during cold operation of the engine has been employed.

For example, JP 2010-163920A discloses a technique of achieving early completion of engine warm-up by, during cold operation of an engine, passing a small amount of coolant through a cylinder head in a direction from one end to the other end of a cylinder row (row of cylinders), while cutting off a coolant flow to a cylinder block. Then, along with a rise in temperature of coolant, coolant is additionally passed through the cylinder block in the direction from the one end to the other end of the cylinder row, and a flow rate of coolant to be circulated through the cylinder head is increased.

However, considering realization of further improved fuel economy, the above conventional technique is not enough in terms of promotion (speeding-up) of engine warm-up.

Therefore, it is conceivable that heat of exhaust gas flowing through an exhaust passage is utilized to allow coolant to rise in temperature, thereby promoting engine warm-up. In this case, however, the coolant draws heat of the exhaust gas to cause the exhaust gas to decrease in temperature, so that, in a catalyst of an exhaust gas purification device to be activated by means of heat of the exhaust gas, a period of time required to reach an activation temperature is increased, which is disadvantageous in terms of early activation of the exhaust gas purification device.

Meanwhile, primarily in order to reduce nitrogen oxides (NOx) in exhaust gas and improve fuel economy during partial-load conditions, a technique of extracting a part of post-combustion exhaust gas and leading the extracted exhaust gas to an intake side to allow it to be re-charged, so-called "EGR (Exhaust Gas Recirculation)", has heretofore been performed.

In this technique, it is advantageous, particularly for diesel engines, to perform heat exchange between exhaust gas and coolant through an EGR cooler to thereby cool the exhaust gas, because, when a combustion temperature in a combustion chamber exceeds a given value, an amount of nitrogen oxides is sharply increased.

However, in a conventional system, during cold operation of the engine, coolant stagnates in the EGR cooler without flowing therethrough, so that the coolant is gradually raised in temperature due to heat of exhaust gas, and eventually boiled, which is likely to lead to breakage of the EGR cooler.

SUMMARY OF THE INVENTION

Therefore, the present invention addresses a technical problem of promoting engine warm-up during cold operation of an engine, while improving reliability of an EGR cooler.

In order to solve the above technical problem, the present invention provides a system for cooling an engine which comprises a cylinder block, a cylinder head, an intake passage, an exhaust passage, an EGR passage connecting the exhaust passage to the intake passage to recirculate a part of exhaust gas to the intake passage therethrough, and an EGR cooler for performing heat exchange between exhaust gas in the EGR passage and coolant, wherein each of the cylinder block and the cylinder head is provided with a water jacket through which coolant flows. The system comprises: a water pump for discharging the coolant; a head-side circulation pathway through which the coolant from the water pump is circulated via the water jacket of the cylinder head and the EGR cooler; a block-side circulation pathway through which the coolant from the water pump is circulated via the water jacket of the cylinder block; and a switching valve unit operable, during cold operation of the engine, to pass the coolant from the water pump, along the head-side circulation pathway, and, when a temperature of the engine is raised up to a predetermined value, to pass the coolant from the water pump, along not only the head-side circulation pathway but also the block-side circulation pathway.

DESCRIPTION OF EMBODIMENTS

With reference to FIGS. 1 to 8, an engine cooling system of the present invention will now be described based on one embodiment thereof.

Figure 1:
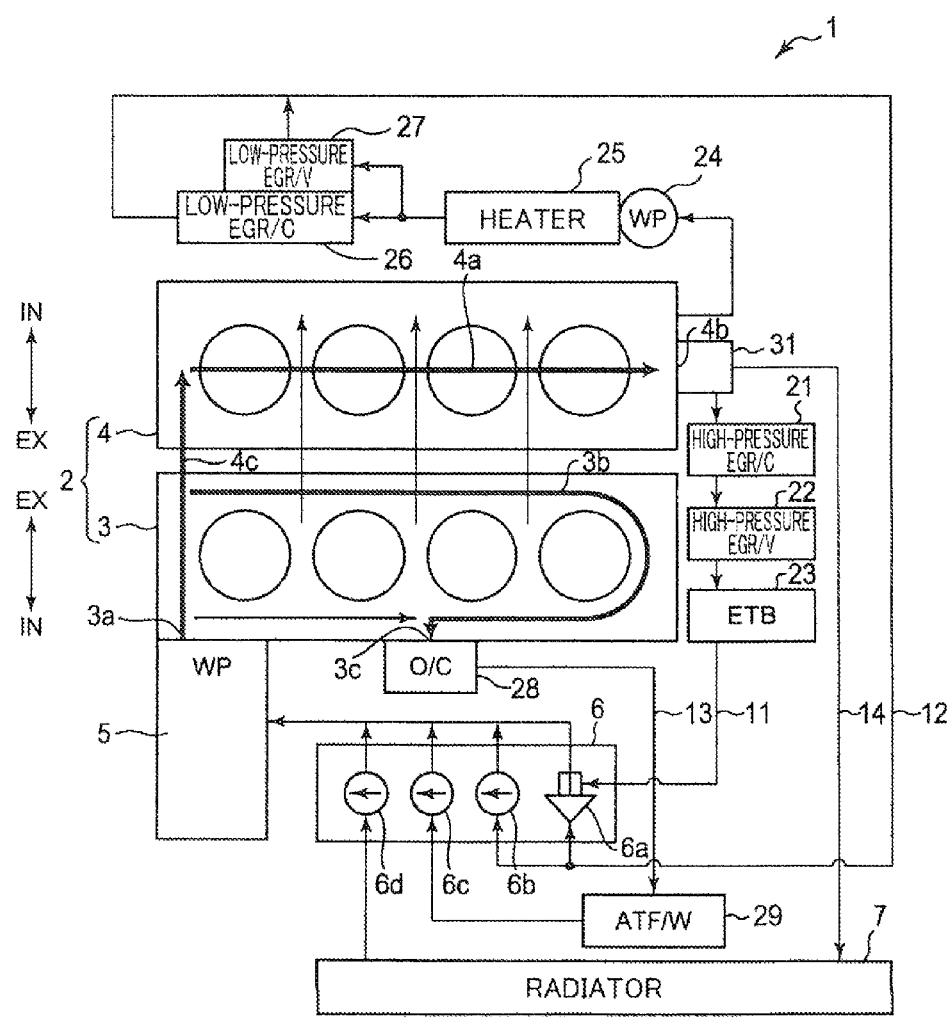
FIG. 1 is a diagram illustrating a schematic configuration of an engine cooling system, according to one embodiment of the present invention.

FIG. 1 illustrates a schematic configuration of a multi-cylinder engine cooling system 1 according to one embodiment of the present invention. A multi-cylinder engine 2 (hereinafter referred to simply as "engine") in this embodiment is a so-called cross-flow type in-line four-cylinder diesel engine in which four cylinders are arranged in series along an axial direction of a crankshaft, and aftermentioned intake and exhaust passages are disposed on respective opposite sides with respect to an aftermentioned cylinder head 4. The engine 2 is installed in an engine compartment (not illustrated) provided in a front of a vehicle, in a posture where a cylinder row (row of the cylinders) and a cylinder axis of each of the cylinders are oriented, respectively, in a vehicle width direction and in an upward-downward direction, and the exhaust passage is located rearward of the engine in a vehicle forward-rearward direction.

The engine 2 is primarily comprised of a cylinder block 3 and a cylinder head 4 provided on an upper side of the cylinder block 3.

In FIG. 1, the cylinder block 3 is illustrated as a view when viewed downwardly from thereabove, and the cylinder head 4 is illustrated as a view when viewed upwardly from therebelow. Thus, a positional relationship between an intake side (indicated as "IN" in FIG. 1) and an exhaust side (indicated as "EX" in FIG. 1) becomes opposite between the cylinder block 3 and the cylinder head 4.

The cylinder block 3 has a block-side water jacket 3b formed around aftermentioned combustion chambers 42 to serve as a flow passage for cooling water (coolant), an inlet port 3a for introducing cooling water into the block-side water jacket 3b, and a block-side outlet port 3c for discharging the cooling water from the block-side water jacket 3b.

The cylinder head 4 has a head-side water jacket 4a formed around aftermentioned combustion chambers 42 to serve as a flow passage for passing cooling water from one end to the other end of the cylinder head 4, and a head-side outlet port 4b for discharging the cooling water from the head-side water jacket 4a to an outside of the cylinder head 4.

A communication port 4c is provided between the cylinder block 3 and the cylinder head 4 to provide fluid communication between the block-side water jacket 3b and the head-side water jacket 4a. Cooling water introduced into the block-side water jacket 3b from the inlet port 3a of the cylinder block 3 is passed to the head-side water jacket 4a via the communication port 4c.

A water pump 5 is provided in adjacent relation to the inlet port 3a of the cylinder block 3 to supply cooling water into the water jackets 3b, 4a through the inlet port 3a. The water pump 5 is configured to be passively driven by rotation of the engine 2, so that a flow rate of cooling water from the water pump 5 is approximately proportional to an engine speed of the engine 2.

The cooling system 1 has a cooling circuit for circulating cooling water through the water jackets 3b, 4a, and, optionally, via a radiator 7 or the like. The cooling circuit comprises: first to fourth pathways 11 to 14, and a set of a thermostat valve 6a and first to third control valves 6b to 6d connected to the first to fourth pathways 11 to 14. The thermostat valve 6a and the first to third control valves 6b to 6d are integrally constructed as a switching valve unit 6. The switching valve unit 6 is configured such that, under control of an aftermentioned cooling circuit control section 101, the thermostat valve 6a and the first to third control valves 6b to 6d are opened and closed at desired timings to thereby switch a pathway for circulating coolant between the first to fourth pathways 11 to 14. Each of the first pathway 11 and the second pathway 12 is equivalent to "head-side circulation pathway" set forth in the appended claims, and the third pathway 13 is equivalent to "block-side circulation pathway" set forth in the appended claims.

With reference to FIG. 1, the first to fourth pathways 11 to 14 will be described in detail.

The first pathway 11 couples the head-side outlet port 4b and the inlet port 3a (water pump 5) together. The first pathway 11 bypasses the radiator 7, and passes through a water temperature sensor 31 for measuring a cooling water temperature, an aftermentioned high-pressure EGR cooler 21, an aftermentioned high-pressure EGR valve 22, an aftermentioned electronic throttle valve (electronic throttle body (ETB)) 23, and the thermostat valve 6a, in this order. The water temperature sensor 31 is provided in adjacent relation to the head-side outlet port 4b.

Each of the first to third control valves 6b to 6d is configured to change a respective one of three valve opening areas for the second to fourth pathways 12 to 14, and capable of being switched between at least a valve closed state for cutting off a flow of cooling water to a respective one of the pathways 12 to 14, and a valve open state for permitting the flow of cooling water to the respective one of the pathways 12 to 14.

The thermostat valve 6a is configured to be opened when the temperature of cooling water is increased up to a predetermined value or more due to malfunction of one or more of the control valves 6b to 6d, i.e., to be closed in a normal state. That is, in the normal state, the thermostat valve 6a is closed, so that diversion of cooling water from the second pathway 12 into the first pathway 11 through the thermostat valve 6a is inhibited. On the other hand, in an abnormal state, the thermostat valve 6a is opened, so that cooling water from the head-side water jacket 4a is passed and circulated through both of the first pathway 11 and the second pathway 12. In this situation, the circulation of cooling water through both of the first pathway 11 and the second pathway 12 promotes heat loss from cooling water and thus suppresses excessive rise in temperature of the engine 2 to protect the engine 2.

The second pathway 12 couples the head-side outlet port 4b and the inlet port 3a (water pump 5) together. The second pathway 12 bypasses the radiator 7, and passes through an idling-stop water pump 24, an air-conditioning heater core 25, a set of an aftermentioned low-pressure EGR cooler 26 and an aftermentioned low-pressure EGR valve 27, and the first control valve 6b, in this order.

The idling-stop water pump 24 is configured to pass cooling water through the air-conditioning heater core 25 during a period where the engine 2 is temporarily stopped by idling stop control. The low-pressure EGR cooler 26 and the low-pressure EGR valve 27 are interposed in the second pathway 12 in parallel relation to each other.

The third pathway 13 couples the block-side outlet port 3c and the inlet port 3a (water pump 5) together. The third pathway 13 bypasses the radiator 7, and passes through an engine-oil cooler 28, an automatic-transmission-oil heat exchanger 29, and the second control valve 6c, in this order. The engine-oil cooler 28 is provided in adjacent relation to the block-side outlet port 3c.

The fourth pathway 14 couples the head-side outlet port 4b and the inlet port 3a (water pump 5) together. The fourth pathway 14 passes through the water temperature sensor 31, the radiator 7, and the third control valve 6d, in this order.

Figure 2:
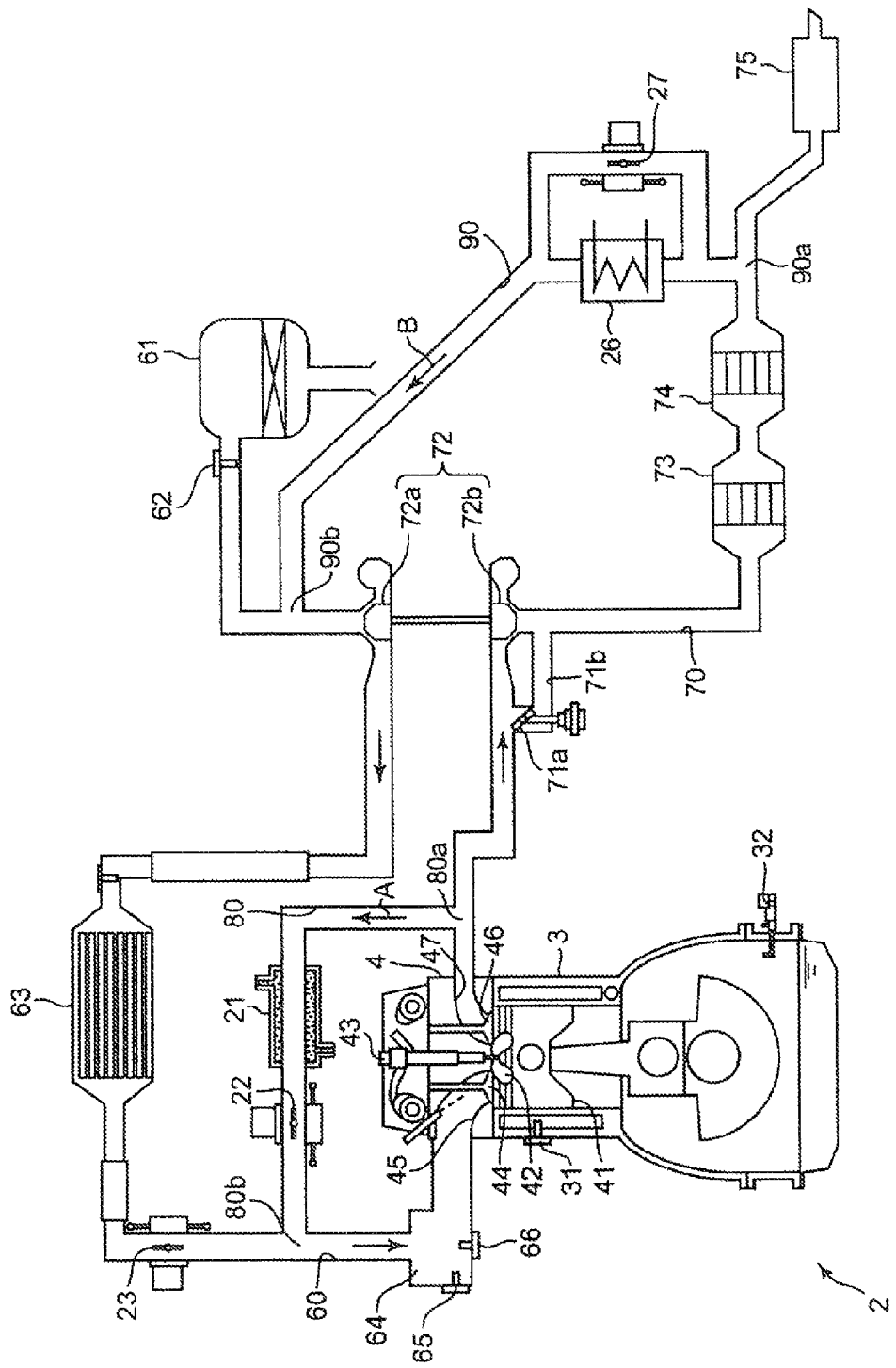
FIG. 2 is a diagram illustrating a schematic configuration of intake and exhaust passages of an engine in the embodiment.

FIG. 2 is a diagram illustrating a schematic configuration of the intake and exhaust passages of the engine 2.

As illustrated in FIG. 2, the engine 2 has a plurality of combustion chambers 42 each defined by the cylinder block 3, the cylinder head 4, and a respective one of a plurality of pistons 41. The cylinder head 4 is provided with a plurality of fuel injection valves 43. Each of the fuel injection valves 43 is configured to inject fuel into a respective one of combustion chambers 42, wherein the injected fuel is combusted by compression ignition to drive the engine 2. The fuel injection valve 43 is an electronically-controlled type, and a fuel supply system is a common rail type.

An intake port 45 to be opened and closed by an intake valve 44 and an exhaust port 47 to be opened and closed by an exhaust valve 46 are opened to each of the combustion chambers 42 of the engine 2, and an intake passage 60 and an exhaust passage 70 are connected, respectively, to the intake port 45 and the exhaust port 47.

The intake passage 60 is provided with: an air filter 61; an intake-air flow sensor 62 for detecting an intake air volume; a compressor 72a of an exhaust turbo-supercharger 72 (hereinafter referred to simply as "supercharger 72"); an intercooler 63 for cooling exhaust gas; an electronic throttle valve (electronic throttle body (ETB)) 23; and a surge tank 64, in this order from an upstream side to a downstream side thereof.

The surge tank 64 and the intake port 45 of each cylinder are connected by one of a plurality of independent intake pipes (no reference code is assigned thereto) separated individually. Further, an intake-air temperature sensor 65 for detecting an intake-air temperature and an intake pressure sensor 66 for detecting an intake pressure are installed in the surge tank 64.

The exhaust passage 70 is provided with: a wastegate valve 71a; a bypass passage 71b; a turbine 72b of the supercharger 72 configured to be rotated by an exhaust gas stream; an oxidation catalyst 73 for reducing CO, HC and others in exhaust gas; a diesel particulate filter (DPF) 74 for trapping particulate in exhaust gas; and a muffler 75 for reducing exhaust sound, in this order from an upstream side to a downstream side thereof.

The wastegate valve 71a is a type installable independently of a main unit of the supercharger 72, so-called "external wastegate valve", and is configured to diverge a part of exhaust gas into the bypass passage 71b, thereby adjusting an inflow of exhaust gas into the turbine 72b to control a rotational speed of the supercharger 72. This makes it possible to obtain a stable supercharging pressure (boost pressure) and prevent damage to the engine 2 and the supercharger 72.

The intake passage 60 and the exhaust passage 70 are connected to each other through a high-pressure EGR passage 80 for use, primarily, during a low load operation of the engine 2, and a low-pressure EGR passage 90 for use, primarily, during a medium/high-load operation of the engine 2. The high-pressure EGR passage 80 is equivalent to "first EGR passage" set forth in the appended claims, and the low-pressure EGR passage 90 is equivalent to "second EGR passage" set forth in the appended claims.

The high-pressure EGR passage 80 is configured such that an upstream end 80a thereof is connected to the exhaust passage 70 at a position upstream of the turbine 72b, and a downstream end 80b thereof is connected to the intake passage 60 at a position downstream of the electronic throttle valve 23 and upstream of the surge tank 64. Therefore, EGR gas having a relatively high fluid dynamic pressure, consisting of exhaust gas before passing through the turbine 72b, flows through the high-pressure EGR passage 80. The high-pressure EGR passage 80 is provided with a high-pressure EGR cooler 21 for cooling EGR gas, and a high-pressure EGR valve 22 for adjusting an amount of recirculation of EGR gas, in this order from an upstream side to a downstream side thereof. The high-pressure EGR cooler 21 is equivalent to "first EGR cooler" set forth in the appended claims.

The low-pressure EGR passage 90 is configured such that an upstream end 90a thereof is connected to the exhaust passage 70 at a position downstream of the diesel particulate filter 74, and a downstream end 90b thereof is connected to the intake passage 60 at a position downstream of the intake-air flow sensor 62 and upstream of the compressor 72a. Therefore, EGR gas having a relatively low fluid dynamic pressure, consisting of exhaust gas after passing through the turbine 72b, flows through the low-pressure EGR passage 90. The low-pressure EGR passage 90 is branched, at a midway position thereof, into two parallel sub-passages which are connected, respectively, to a low-pressure EGR cooler 26 for cooling EGR gas, and a low-pressure EGR valve 27 for adjusting an amount of recirculation of EGR gas, and the sub-passages are joined together at a position downstream of the cooler 26 and the valve 27. The low-pressure EGR cooler 26 is equivalent to "second EGR cooler" set forth in the appended claims.

As above, the low-pressure EGR passage 90 is connected to a region downstream of the diesel particulate filter 74, so that it becomes possible to prevent particulate in exhaust gas from entering the low-pressure EGR passage 90, causing degradation of the low-pressure EGR valve 27.

Further, the low-pressure EGR passage 90 is branched, at a midway position thereof, into two parallel sub-passages which are connected, respectively, to the low-pressure EGR cooler 26 and the low-pressure EGR valve 27. This is because a flow rate of EGR gas flowing through the low-pressure EGR passage 90 is greater than that in the high-pressure EGR passage 80, and, if the low-pressure EGR cooler 26 and the low-pressure EGR valve 27 are serially interposed therein, they produce a large resistance to a flow of EGR gas, i.e., it is necessary to reduce this resistance as much as possible.

With reference to FIG. 2, flows of intake air and exhaust gas during driving of the engine 2 will be briefly described below.

Intake air (fresh air) supplied to the intake passage 60 through the air filter 61 is compressed by the compressor 72a, after passing through the intake-air flow sensor 62 for detecting the intake air volume. The intake air raised in temperature by the compression is cooled by the intercooler 63 and supplied to the surge tank 64. The intake air supplied into the surge tank 64 is introduced into each of the combustion chambers 42, after passing through the intake-air temperature sensor 65 for detecting the intake-air temperature and the intake pressure sensor 66 for detecting the intake pressure. In each of each of the combustion chambers 42, the introduced intake air reacts with fuel injected from the fuel injection valve 43, and thereby autoignition combustion occurs.

Exhaust gas discharged from the combustion chamber after the combustion acts to rotate the turbine 72b of the supercharger 72. In this process, a flow rate of exhaust gas flowing into the turbine 72b is adjusted by the wastegate valve 71a. Then, exhaust gas after passing through the turbine 72b passes through the oxidation catalyst 73 and the diesel particulate filter 74. In this process, CO, HC and others contained in the exhaust gas are reduced, and particulate contained in the exhaust gas is trapped. Exhaust gas after passing through the diesel particulate filter 74 is emitted to an outside of the vehicle via the muffler 75.

In the above process, each of the high-pressure EGR valve 22, the electronic throttle valve 23 and the low-pressure EGR valve 27 is controlled by an aftermentioned gas circuit control section 102 of an ECU 100, in such a manner as to change an EGR ratio in the engine 2, or switch an exhaust gas recirculation passage between the high-pressure EGR passage 80 and the low-pressure EGR passage 90, depending on load of the engine 2. In a normal operation, the electronic throttle valve 23 is maintained in an open state.

When the engine 2 is initially operated under a low load less than a predetermined load (during cold operation of the engine), the high-pressure EGR valve 22 is opened, and the low-pressure EGR valve 27 is fully closed, so that exhaust gas is recirculated through the high-pressure EGR passage 80, as indicated by the arrowed line A. That is, a part of exhaust gas flowing through a region of the exhaust passage 70 upstream of the turbine 72b flows into the high-pressure EGR passage 80 to serve as EGR gas. This EGR gas is cooled by the high-pressure EGR cooler 21, and supplied to a region of the intake passage 60 downstream of the compressor 72a via the high-pressure EGR valve 22.

As the load of the engine 2 is gradually increased, the supercharging pressure from the supercharger 72 becomes higher, so that EGR gas becomes less likely to be recirculated from the high-pressure EGR passage 80 to the intake passage 60. Therefore, the electronic throttle valve 23 in the intake passage 60 is gradually closed to lower an intake pressure in a region of the intake passage 60 downstream of the electronic throttle valve 23. This facilitates the recirculation of EGR gas from the high-pressure EGR passage 80 to the intake passage 60.

Subsequently, when the engine 2 is operated under a medium/high-load equal to or greater than a predetermined load, the supercharging pressure is further increased, so that it become impossible to maintain the recirculation of EGR gas from the high-pressure EGR passage 80 to the intake passage 60 by means of the adjustment of the electronic throttle valve 23. Thus, the electronic throttle valve 23 is fully opened again, and the high-pressure EGR valve 22 is fully closed. Further, the low-pressure EGR valve 27 is opened, so that exhaust gas is recirculated through the low-pressure EGR passage 90, as indicated by the arrowed line B. That is, a part of exhaust gas flowing through a region of the exhaust passage 70 downstream of the turbine 72b flows into the low-pressure EGR passage 90 to serve as EGR gas. This EGR gas is cooled by the low-pressure EGR cooler 26, and supplied to a region of the intake passage 60 upstream of the compressor 72a (to which no supercharging pressure is applied) via the low-pressure EGR valve 27.

Alternatively, when the load of the engine 2 is increased from the low load to the medium load, the control may be performed to allow EGR gas to simultaneously flow through the high-pressure EGR passage 80 and the low-pressure EGR passage 90.

The diesel particulate filter 74 and the oxidation catalyst 73 are installed in one heat-resistant casing, and, according to need, the diesel particulate filter 74 is regenerated using the oxidation catalyst 73. Specifically, the ECU 100 is operable, based on a result of detection of a pressure difference sensor (not illustrated) for detecting a pressure difference between pressures at respective positions upstream and downstream of the diesel particulate filter 74, to calculate an amount of particulate trapped by the diesel particulate filter 74. As a result, when it is determined that a predetermined amount or more of particulate is trapped, the ECU 100 is operable to instruct the fuel injection valve 43 to inject fuel on expansion stroke of the engine 2 so as to supply unburned fuel to the oxidation catalyst 73. The supplied unburned fuel is oxidized by the oxidation catalyst 73, to rapidly increase an exhaust gas temperature in a region downstream of the oxidation catalyst 73. Thus, the particulate trapped by the diesel particulate filter 74 is burned, so that the diesel particulate filter 74 is regenerated. However, this regeneration control and the aforementioned EGR gas recirculation are not simultaneously performed.

Figure 3:
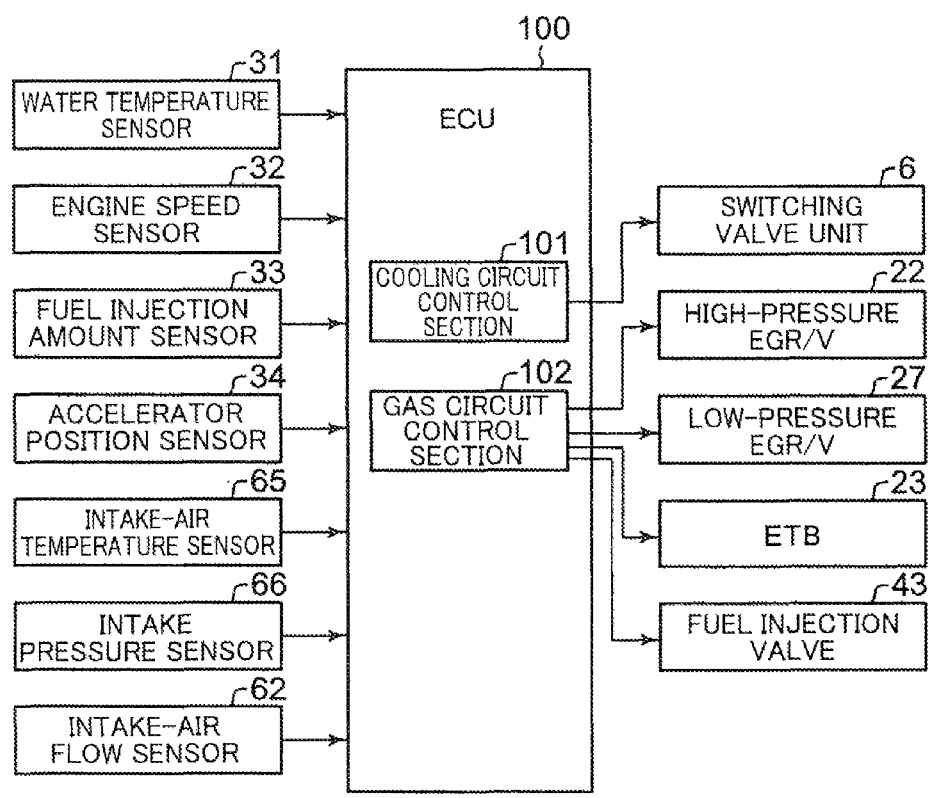
FIG. 3 is a block diagram illustrating a schematic configuration of a control system.

FIG. 3 is a block diagram illustrating a schematic configuration of a control system for the engine 2.

As illustrated FIG. 3, an ECU (Engine Control Unit) 100 for controlling the engine 2 is constructed using a microcomputer, and comprises a cooling circuit control section 101 and a gas circuit control section 102.

The cooling circuit control section 101 is operable, based on detection values (cooling water temperature, engine speed, fuel injection amount) of the water temperature sensor 31, an engine speed sensor 32 and a fuel injection amount sensor 33, to estimate a wall temperature of a ceiling section of the combustion chambers 42, i.e., a temperature of a lower surface of the cylinder head 4 constituting the ceiling section of the combustion chambers 42 (hereinafter referred to simply as "head temperature"), and, based on the estimated head temperature, to control the switching valve unit 6 by an after-mentioned control process. In this way, the cooling circuit for circulating cooling water, described with reference to FIG. 1, is switched.

The gas circuit control section 102 is operable, based on detection values (accelerator position, intake-air amount, intake-air temperature, intake pressure) of an accelerator position sensor 34, the intake-air flow sensor 62, the intake-air temperature sensor 65 and the intake pressure sensor 66, to control the high-pressure EGR valve 22, the low-pressure EGR valve 27, the electronic throttle valve 23 and others to thereby perform adjustment of the EGR ratio, switching of the EGR pathways and others. The gas circuit control section 102 is also operable to control the fuel injection valve 43 to adjust a fuel injection amount, a fuel injection timing and others.

Figure 4:
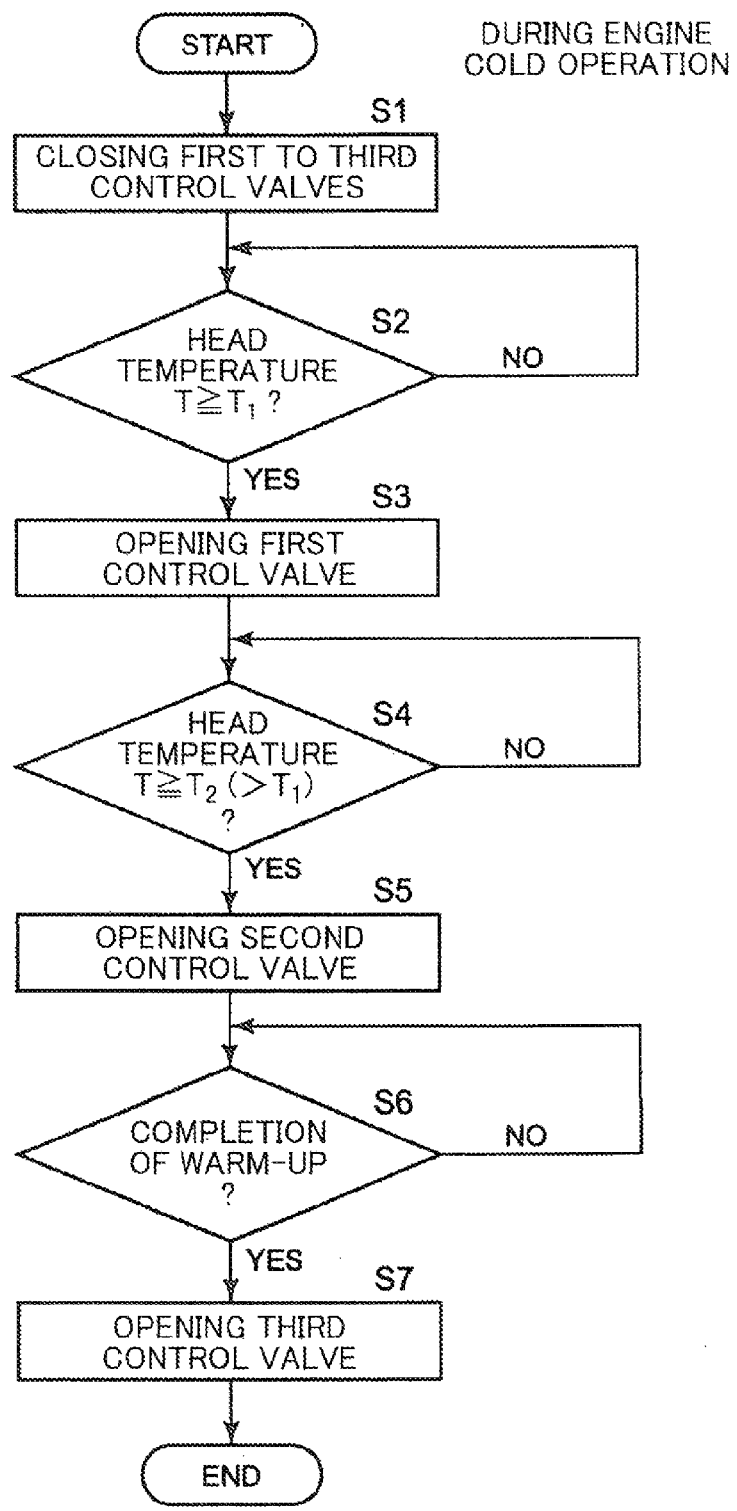
FIG. 4 is a flowchart illustrating a control process to be executed by a cooling circuit control section of the cooling system.

FIG. 4 is a flowchart illustrating a control process to be executed by the cooling circuit control section 101 illustrated in FIG. 3, and FIGS. 5 to 8 are block diagrams illustrating a cooling process depending on an engine temperature. According to the flowchart in FIG. 4, the control process for the cooling system 1 to be executed by the cooling circuit control section 101 will be described below with reference to FIGS. 5 to 8.

First of all, during the engine cold operation, i.e., during some period immediately after an engine cold start, all of the first to third control valves 6b to 6d are closed (Step S1).

Figure 5:
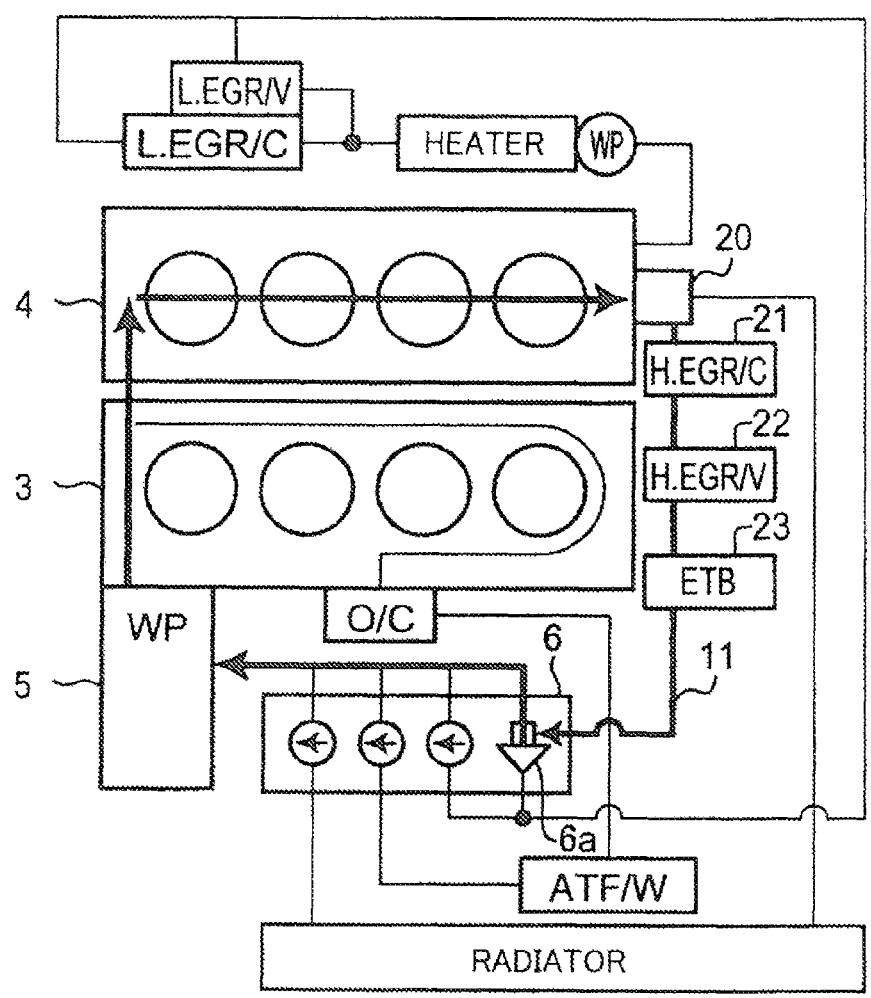
FIG. 5 is a diagram illustrating a coolant flow during cold operation of the engine.

Thus, as illustrated in FIG. 5, cooling water is circulated along only the first pathway 11, so that coolant is passed through the high-pressure EGR cooler 21, the high-pressure EGR valve 22 and the electronic throttle valve 23 each located on the first pathway 11. An amount of cooling water to be passed along the first pathway 11 may be set to a relatively small value which is enough to keep cooling water in the cylinder head 4 from being locally heated and boiled. Further, a certain amount of cooling water is always passed along the first pathway 11, irrespective of the engine temperature.

Then, it is determined whether a head temperature T of the engine 2 is equal to or greater than a predetermined temperature $T_1$ (e.g., 150° C.) (Step S2). The determination in the Step S2 may be a determination as to whether the cooling water temperature of the engine 2 is equal to or greater than a predetermined temperature $t_1$ (e.g., 20° C.). The temperature $T_1$ (or temperature $t_1$) is equivalent to "lower-side predetermined value" set forth in the appended claims.

When it is determined in the Step S2 that the head temperature T is equal to or greater than the predetermined temperature $T_1$, the first control valve 6b is opened (Step S3).

Figure 6:
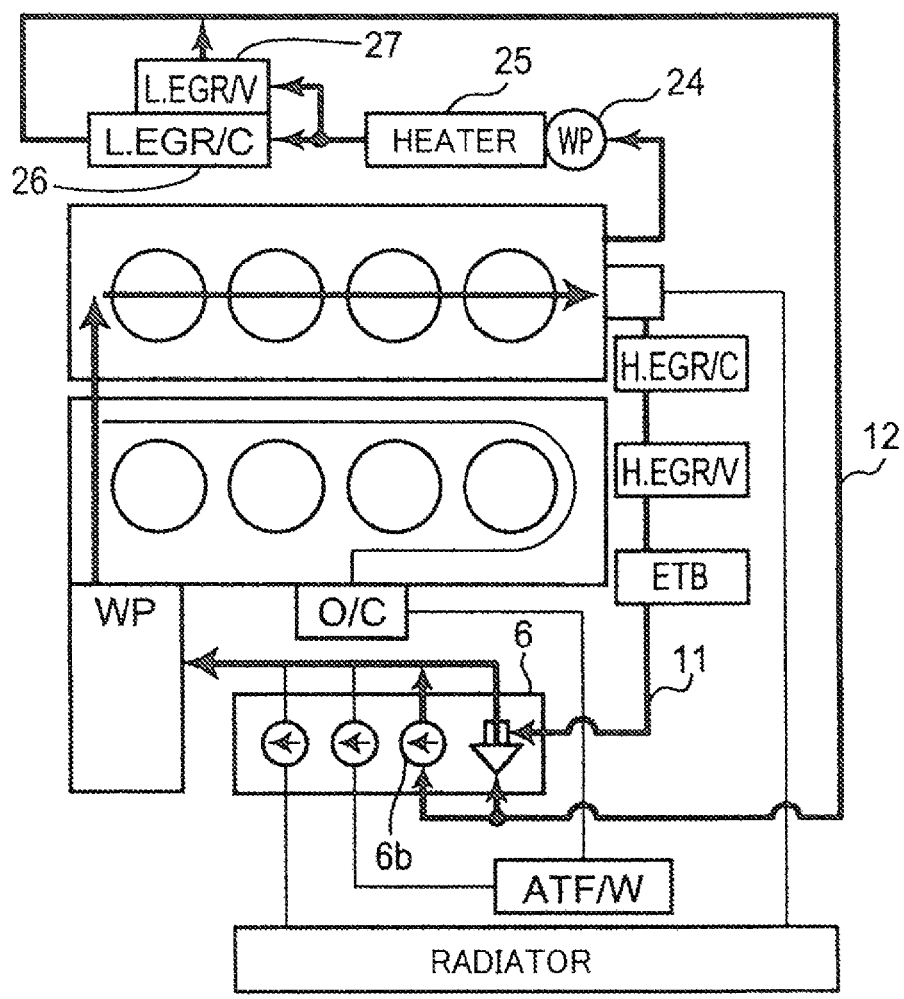
FIG. 6 is a diagram illustrating a coolant flow during warm-up operation of the engine.

Thus, as illustrated in FIG. 6, cooling water is circulated along the first pathway 11 and the second pathway 12, so that cooling water is passed through the idling-stop water pump 24, the air-conditioning heater core 25, the low-pressure EGR cooler 26 and the low-pressure EGR valve 27 each located on the second pathway 12, in addition to the components (21, 22, 23) on the first pathway 11.

Then, it is determined whether the head temperature T is equal to or greater than a predetermined temperature $T_2$ ($T_2 > T_1$) (Step S4). The determination in the Step S4 may be a determination as to whether the cooling water temperature is equal to or greater than a predetermined temperature $t_2$ (e.g., 60° C.). The temperature $T_2$ (or temperature $t_2$) is equivalent to "predetermined value" set forth in the appended claims.

When it is determined in the Step S4 that the head temperature T is equal to or greater than the predetermined temperature $T_2$, the second control valve 6c is additionally opened (Step S5).

Figure 7:
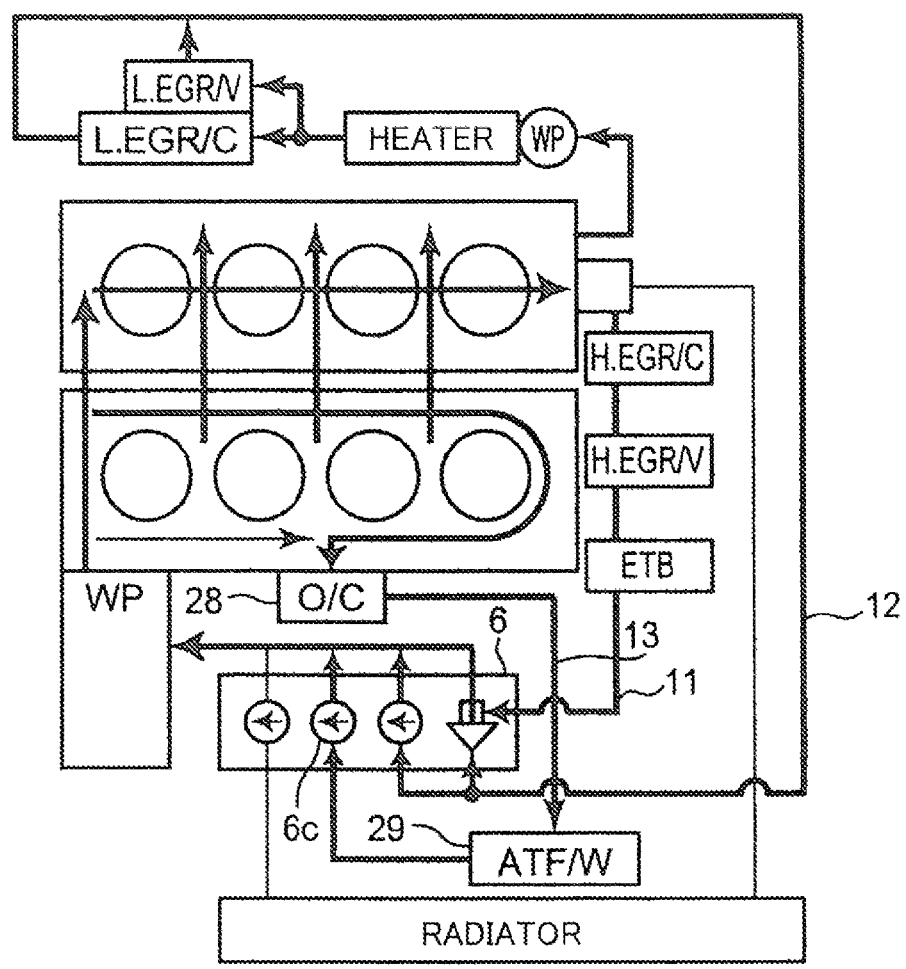
FIG. 7 is a diagram illustrating a coolant flow during warm-up operation of the engine.

Thus, as illustrated in FIG. 7, cooling water is circulated along the first to third pathways 11 to 13, so that cooling water is passed through the engine-oil cooler 28 and the automatic-transmission-oil heat exchanger 29 each located on the third pathway 13, in addition to the components (21, 22, 23, 24, 25, 26, 27) on the first and second pathways 11, 12.

Then, it is determined whether the head temperature T is equal to or greater than a predetermined temperature $T_3$ ($T_3 > T_2$) i.e., whether warm-up of the engine 2 is already completed (Step S6). The determination in the Step S6 may be a determination as to whether the cooling water temperature is equal to or greater than a predetermined temperature $t_3$ (e.g., 80° C.).

Last of all, when it is determined in the Step S6 that warm-up of the engine 2 is completed, the third control valve 6d is additionally opened (Step S7).

Figure 8:
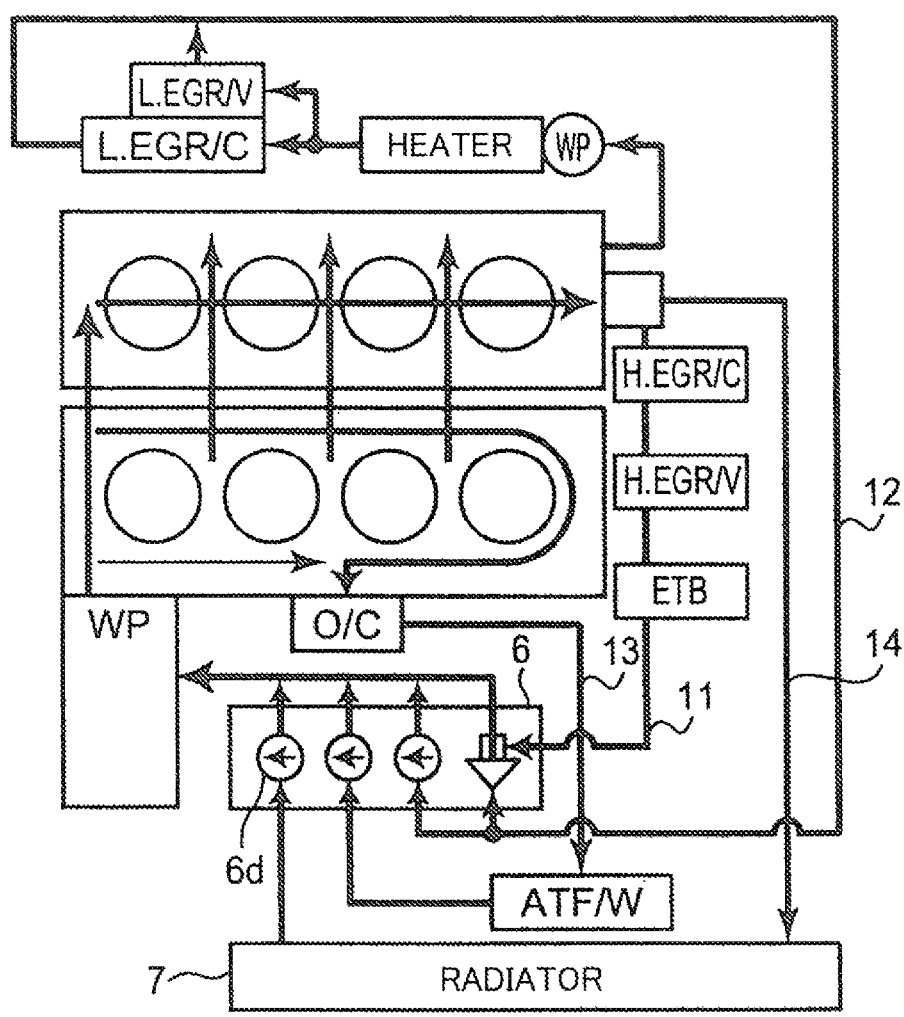
FIG. 8 is a diagram illustrating a coolant flow after completion of warm-up of the engine.

Thus, as illustrated in FIG. 8, cooling water is circulated along all of the first to fourth pathways 11 to 14, so that cooling water is passed through the radiator 7 located on the fourth pathway 14, in addition to the components (21, 22, 23, 24, 25, 26, 27, 28, 29) on the first to third pathways 11 to 13.

Based on the above features, in the above embodiment, the following advantageous effects can be obtained.

During the engine cold operation, the gas circuit control section 102 operates to control the high-pressure EGR valve 22 and the electronic throttle valve 23 to allow EGR gas to flow through the high-pressure EGR passage 80, and the cooling circuit control section 101 operates to close all of the first to third control valves 6b to 6d so as to pass a relatively small amount of cooling water along only the first pathway 11. Thus, heat of the EGR gas is recovered by the high-pressure EGR cooler 21, and cooling water passed along the first pathway 11 is heated by the recovered heat of the EGR gas. Further, cooling water in the first pathway 11 is not positively cooled, because the first pathway 11 bypasses the radiator 7. Therefore, during operation of the engine 2, the cylinder head 4 is gradually raised in temperature.

During the engine cold operation, almost no cooling water flows through the block-side water jacket 3b, so that, during operation of the engine 2, the cylinder block 3 is also gradually raised in temperature.

As above, during the engine cold operation, fundamentally, no cooling water is passed through the block-side water jacket 3b, and a relatively small amount of cooling water is passed through only the head-side water jacket 4a, while being heated by means of heat of EGR gas, so that it becomes possible to raise a temperature around the combustion chambers 42 of the engine 2, thereby accelerating early warm-up of the engine 2.

In addition, cooling water is passed through the high-pressure EGR cooler 21 while being circulated by the water pump 5 driven even during the engine cold operation, so that it becomes possible to prevent breakage of the high-pressure EGR cooler 21 due to boiling of cooling water within the high-pressure EGR cooler 21, and thus ensure reliability of the high-pressure EGR cooler 21.

During the engine cold operation, the intake-air temperature can also be increased by heat of EGR gas, so that it becomes possible to improve combustion stability in the compression-ignition diesel engine 2.

Further, cooling water is always circulated, so that it becomes possible to prevent icing of the electronic throttle valve 23 (water vapor in an intake pipe condenses, causing slowdown in valve opening-closing movement).

Then, in an early stage during the engine warm-up operation, e.g., during a period where $T_2$>head temperature T>$T_1$, the gas circuit control section 102 operates to control the low-pressure EGR valve 27 to allow EGR gas to flow through the low-pressure EGR passage 90, and the cooling circuit control section 101 operates to open the first control valve 6b so as to pass cooling water along the first pathway 11 and the second pathway 12. Thus, heat of the EGR gas is recovered by the low-pressure EGR cooler 26, and cooling water passed along the second pathway 12 is heated by the recovered heat of the EGR gas. Further, cooling water in the second pathway 12 is not positively cooled, because the second pathway 12 bypasses the radiator 7. Therefore, during load operation of the engine 2, the cylinder head 4 is gradually raised in temperature.

Further, in the early stage during the engine warm-up operation, almost no cooling water flows through the block-side water jacket 3b as with during the engine cold operation, so that, during load operation of the engine 2, the cylinder block 3 is gradually raised in temperature. Thus, warm-up of the engine 2 is promoted.

In addition, cooling water is also passed through the air-conditioning heater core 25 on the second pathway 12, so that it becomes possible to heat the air-conditioning heater core 25 by heat exchange with cooling water to ensure heating performance of an air-conditioning device incorporating the air-conditioning heater core 25 from a midway point of the warm-up operation.

Then, in a later stage during the engine warm-up operation, e.g., during a period where $T_3$>head temperature T>$T_2$, the cooling circuit control section 101 operates to additionally open the second control valve 6c so as to pass cooling water along the first to third pathways 11 to 13. Thus, cooling water is passed through the cylinder block 3 along the third pathway 13, so that the cylinder block 3 is cooled to some degree. However, cooling water in the third pathway 13 is not positively cooled, because the third pathway 13 bypasses the radiator 7. Thus, warm-up of the engine 2 is promoted.

In addition, the third pathway 13 passes through the engine-oil cooler 28 and the automatic-transmission-oil heat exchanger 29, so that it becomes possible to cool engine oil, and adequately heat automatic transmission oil to lower its viscosity, thereby early reducing a sliding frictional resistance in the transmission to improve fuel economy.

Further, the above warm-up is performed by means of heat of EGR gas flowing through the EGR passages 80, 90, instead of exhaust gas flowing through the exhaust passage 70, so that a period of time before the oxidation catalyst 73 disposed in the exhaust passage 70 reaches the activation temperature (catalyst light-off time) is not influenced by the warm-up. That is, it becomes possible to achieve both early warm-up of the engine 2 and early activation of the oxidation catalyst 73.

Then, when the warm-up of the engine 2 is completed, the cooling circuit control section 101 operates to additionally open the third control valve 6d so as to pass cooling water along all of the first to fourth pathways 11 to 14. The fourth pathway 14 is connected to the radiator 7, so that it becomes possible to cool cooling water through the radiator 7 to maintain the warmed-up engine 2 at a predetermined temperature.

As above, the warm-up of the engine 2 can be promoted while adequately cooling the engine 2 by controlling the switching valve unit 6 along with a rise in temperature of the engine 2 according to the cooling circuit control section 101, and controlling the EGR gas recalculation depending on load conditions of the engine 2 according to the gas circuit control section 102.

It is to be understood that the present invention is not limited to the exemplified embodiment, but various modifications design changes may be made therein without departing from the spirit and scope thereof as set forth in appended claims.

For example, in the above embodiment, the present invention has been applied to an in-line four-cylinder diesel engine. However, the number of cylinders may be any plural number.

Further, a type of engine is not limited to a diesel engine, but the present invention may also be applied to a gasoline engine.

<Outline of Embodiment>

Last of all, distinctive features of the engine cooling system disclosed in the above embodiment and functions and advantageous effects based on the features will be outlined below.

The technique disclosed in the above embodiment relates to a system for cooling an engine which comprises a cylinder block, a cylinder head, an intake passage, an exhaust passage, an EGR passage connecting the exhaust passage to the intake passage to recirculate a part of exhaust gas to the intake passage therethrough, and an EGR cooler for performing heat exchange between exhaust gas in the EGR passage and coolant, wherein each of the cylinder block and the cylinder head is provided with a water jacket through which coolant flows. The system comprises: a water pump for discharging the coolant; a head-side circulation pathway through which the coolant from the water pump is circulated via the water jacket of the cylinder head and the EGR cooler; a block-side circulation pathway through which the coolant from the water pump is circulated via the water jacket of the cylinder block; and a switching valve unit operable, during cold operation of the engine, to pass the coolant from the water pump, along the head-side circulation pathway, and, when a temperature of the engine is raised up to a predetermined value, to pass the coolant from the water pump, along not only the head-side circulation pathway but also the block-side circulation pathway.

In the engine cooling system having the above feature, two cooling lines for the cylinder head and the cylinder block are achieved, and, during cold operation of the engine, coolant is passed through the water jacket of the cylinder head and the EGR cooler, and heated by means of heat of EGR gas recovered by the EGR cooler during execution of EGR, so that it becomes possible to raise a temperature around combustion chambers of the engine, thereby accelerating early warm-up of the engine. In addition, coolant is passed through the EGR cooler while being circulated, so that it becomes possible to prevent breakage of the EGR cooler due to boiling of coolant within the EGR cooler, and thus ensure reliability of the EGR cooler.

Further, the above warm-up is performed by means of heat of EGR gas flowing through the EGR passage, instead of exhaust gas flowing through the exhaust passage, so that, even in the case where an exhaust gas purification device is disposed in the exhaust passage, a period of time before the exhaust gas purification device reaches its activation temperature is not influenced by the warm-up. That is, it becomes possible to achieve both early warm-up of the engine and early activation of the exhaust gas purification device.

Preferably, in the above system, the engine comprises: a supercharger configured to be rotated by an exhaust gas stream in the exhaust passage to thereby supercharge intake air in the intake passage; a first EGR passage connecting a region of the exhaust passage upstream of the supercharger to a region of the intake passage downstream of the supercharger; a first EGR cooler interposed in the first EGR passage; a second EGR passage connecting a region of the exhaust passage downstream of the supercharger and a region of the intake passage upstream of the supercharger; and a second EGR cooler interposed in the second EGR passage. The head-side circulation pathway comprises a first pathway for passing the coolant through the first EGR cooler, and a second pathway for passing the coolant through the second EGR cooler. The switching valve unit is operable, during cold operation of the engine, to pass the coolant from the water pump, along the first pathway, and, when the temperature of the engine is raised up to a lower-side predetermined value lower than the predetermined value, to pass the coolant from the water pump, along not only the first pathway but also the second pathway.

In the case where two types of EGR passages, the first EGR passage and the second EGR passage, are provided, these EGR passages can be selectively used depending loads of the engine to allow EGR gas extracted from the exhaust passage to be smoothly recirculated to the intake passage. For example, during low-load operation of the engine, a supercharging pressure from the supercharger is relatively low, so that EGR gas can be smoothly recirculated through the first EGR passage connected to a region of the intake passage downstream of the supercharger (i.e., a region of the intake passage where supercharged intake air flows). On the other hand, during medium/high-load operation of the engine, the supercharging pressure is increased, so that it becomes difficult to allow EGR gas to flow through the first EGR passage. Therefore, during the medium/high-load operation of the engine, the second EGR passage connected to a region of the intake passage upstream of the supercharger (i.e., a region of the intake passage where pre-supercharged low-pressure intake air flows) is used to allow EGR gas to be smoothly recirculated through the second EGR passage.

As mentioned above, during the low-load operation of the engine (and during the cold operation), EGR gas is extracted to flow through the first EGR passage, and concurrently coolant is passed along the first pathway, so that it becomes possible to recover heat of the EGR gas through the first EGR cooler located in the first EGR passage and use the recovered heat for heating coolant. During the medium/high-load operation of the engine, EGR gas is extracted to flow through the second EGR passage, and concurrently coolant is passed along the second pathway, so that it becomes possible to recover heat of the EGR gas through the second EGR cooler located in the second EGR passage and use the recovered heat for heating coolant. The above feature makes it possible to recover heat of EGR gas and use the recovered heat for warm-up of the engine, irrespective of an operating state of the engine, to improve warm-up performance.

Preferably, in the above system, the first pathway is configured to always circulate the coolant in an amount less than that in the second pathway, and the switching valve unit comprises a first control valve and a second control valve each configured to change a respective one of a valve opening area for the second pathway and a valve opening area for the block-side circulation pathway, depending on a warm-up state of the engine.

According to this feature, respective flow rates of the second pathway and the block-side circulation pathway can be controlled depending on the warm-up state of the engine, while always passing a small amount of coolant along the first pathway, so that it becomes possible to further adequately promote warm-up of the engine. In addition, during the cold operation of the engine, an intake-air temperature can be increased by heat of EGR gas flowing through the first EGR passage, so that it becomes possible to improve combustion stability, particularly, in a compression-ignition diesel engine.

More preferably, in the above system, the second pathway is further provided with an air-conditioning heater core for performing heat exchange with the coolant.

According to this feature, the air-conditioning heater core is heated by heat exchange with the coolant, so that it becomes possible to ensure heating performance of an air-conditioning device incorporating the air-conditioning heater core from a midway point of the warm-up operation.

This application is based on Japanese Patent application No. 2013-057813 filed in Japan Patent Office on Mar. 21, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

Industrial Applicability

As mentioned above, in an engine of an automotive vehicle or the like, the present invention makes it possible to promote warm-up during cold operation of the engine, and improve reliability of an EGR cooler. Thus, the present invention is suitably usable in the industrial field of manufacturing of this type of engine.

What is claimed is:

1. A system for cooling an engine, the engine comprising a cylinder block, a cylinder head, an intake passage, an exhaust passage, an EGR passage connecting the exhaust passage to the intake passage to recirculate a part of exhaust gas to the intake passage therethrough, an EGR cooler for performing heat exchange between exhaust gas in the EGR passage and coolant, and a radiator for cooling the coolant, each of the cylinder block and the cylinder head being provided with a water jacket through which the coolant flows, the system comprising:
   a water pump for discharging the coolant;
   a head-side circulation pathway through which the coolant from the water pump is circulated via the water jacket of the cylinder head and the EGR cooler while bypassing the radiator;
   a block-side circulation pathway through which the coolant from the water pump is circulated via the water jacket of the cylinder block while bypassing the radiator; and
   a switching valve unit operable, when a temperature of the engine is lower than a predetermined value which is lower than a warm-up completion temperature, to pass the coolant from the water pump, along the head-side circulation pathway, and, when the temperature of the engine is equal to or higher than the predetermined value and lower than the warm-up completion temperature, to pass the coolant from the water pump, along not only the head-side circulation pathway but also the block-side circulation pathway.

2. A system for cooling an engine, the engine comprising a cylinder block, a cylinder head, an intake passage, an exhaust passage, a supercharger configured to be rotated by an exhaust gas stream in the exhaust passage to thereby supercharge intake air in the intake passage, a first EGR passage connecting a region of the exhaust passage upstream of the supercharger to a region of the intake passage downstream of the supercharger, a first EGR cooler for performing heat exchange between exhaust gas in the first EGR passage and coolant, a second EGR passage connecting a region of the exhaust passage downstream of the supercharger and a region of the intake passage upstream of the supercharger, a second EGR cooler for performing heat exchange between exhaust gas in the second EGR passage and the coolant, and a radiator for cooling the coolant, each of the cylinder block and the cylinder head being provided with a water jacket through which the coolant flows, the system comprising:
   a water pump for discharging the coolant;
   a first head-side circulation pathway through which the coolant from the water pump is circulated via the water jacket of the cylinder head and the first EGR cooler while bypassing the radiator;
   a second head-side circulation pathway through which the coolant from the water pump is circulated via the water jacket of the cylinder head and the second EGR cooler while bypassing the radiator;
   a block-side circulation pathway through which the coolant from the water pump is circulated via the water jacket of the cylinder block; and
   the switching valve unit operable, when a temperature of the engine is lower than a lower-side predetermined value, to pass the coolant from the water pump, along the first head-side circulation pathway, and, when the temperature of the engine is equal to or higher than the lower-side predetermined value and lower than a predetermined value which is higher than the lower-side predetermined value, to pass the coolant from the water pump, along not only the first head-side circulation pathway but also the second head-side circulation pathway, and, when the temperature of the engine is higher than the predetermined value, to pass the coolant from the water pump, along not only the first and second head-side circulation pathways but also the block-side circulation pathway.

3. The system as defined in claim 2, wherein:
   the first head-side circulation pathway is configured to always circulate the coolant in an amount less than that in the second head-side circulation pathway; and
   the switching valve unit comprises a first control valve and a second control valve each configured to change a respective one of a valve opening area for the second head-side circulation pathway and a valve opening area for the block-side circulation pathway, depending on a warm-up state of the engine.

4. The system as defined in claim 3, wherein the second head-side circulation pathway is further provided with an air-conditioning heater core for performing heat exchange with the coolant.

5. A system for cooling an engine, the engine comprising a cylinder block, a cylinder head, an intake passage, an exhaust passage, an EGR passage connecting the exhaust passage to the intake passage to recirculate a part of exhaust gas to the intake passage therethrough, an EGR cooler for performing heat exchange between exhaust gas in the EGR passage and coolant, and a radiator for cooling the coolant, each of the cylinder block and the cylinder head being provided with a water jacket through which the coolant flows, the system comprising:
   a water pump for discharging the coolant;
   a head-side circulation pathway through which the coolant from the water pump is circulated via the water jacket of the cylinder head and the EGR cooler while bypassing the radiator;
   a block-side circulation pathway through which the coolant from the water pump is circulated via the water jacket of the cylinder block while bypassing the radiator;
   an additional circulation pathway through which the coolant from the water pump is circulated via the water jacket of the cylinder block and the radiator; and
   a switching valve unit operable, when a temperature of the engine is lower than a predetermined value which is lower than a warm-up completion temperature, to pass the coolant from the water pump, along the head-side circulation pathway, and, when the temperature of the engine is equal to or higher than the predetermined value and lower than the warm-up completion temperature, to pass the coolant from the water pump, along not only the head-side circulation pathway but also the block-side circulation pathway, and, when the temperature of the engine is equal to or higher than the warm-up completion temperature, to pass the coolant from the water pump, along not only the head-side circulation pathway and the block-side circulation pathway but also the additional circulation pathway.

* * * * *